June 19, 1962

A. F. RICHARDS 3,039,343

DOUBLE CUTTING METAL SHEARS

Filed Nov. 7, 1960

INVENTOR.
ARTHUR F. RICHARDS
BY
Robinson & Berry
ATTORNEYS

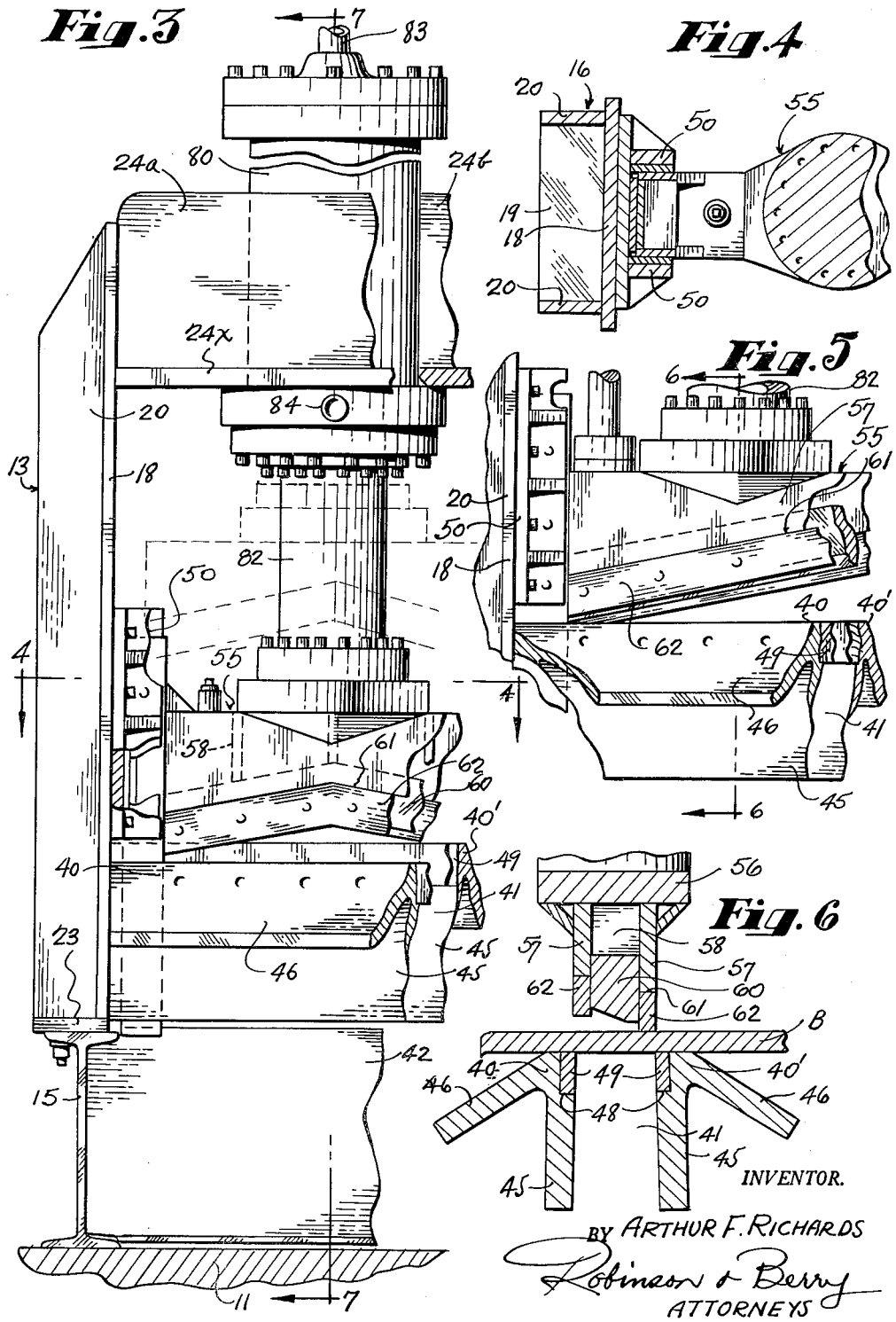

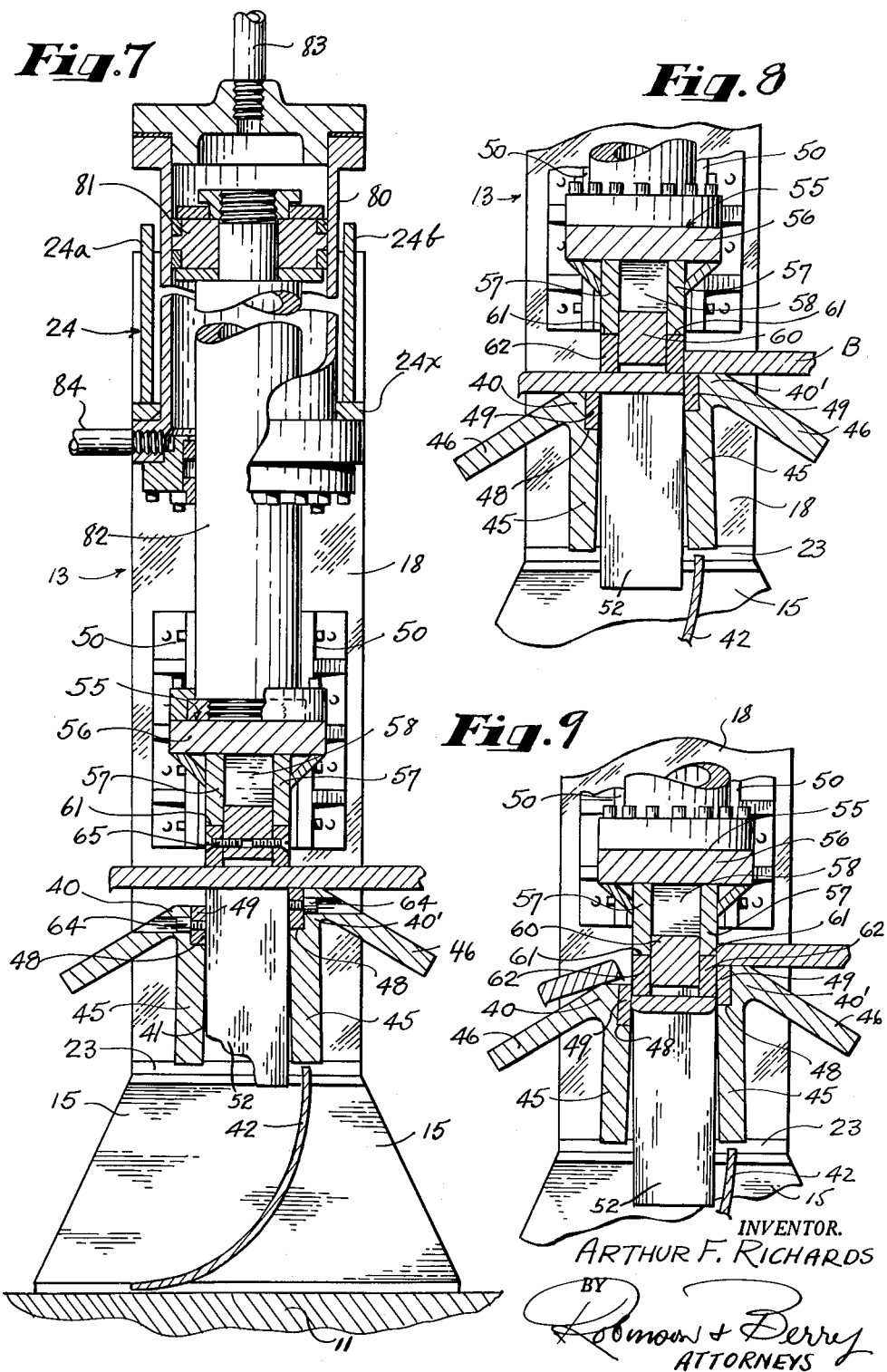

June 19, 1962 A. F. RICHARDS 3,039,343
DOUBLE CUTTING METAL SHEARS
Filed Nov. 7, 1960 4 Sheets-Sheet 4

INVENTOR.
ARTHUR F. RICHARDS
BY
Robinson & Berry
ATTORNEYS

United States Patent Office 3,039,343
Patented June 19, 1962

3,039,343
DOUBLE CUTTING METAL SHEARS
Arthur F. Richards, Eugene, Oreg., assignor, by mesne assignments, to Richards Shear Company, Seattle, Wash., a corporation of Washington
Filed Nov. 7, 1960, Ser. No. 67,624
7 Claims. (Cl. 83—105)

This invention relates to power operated metal shears and it pertains more particularly to improvements in what is herein designated as a "double cutting shear" designed for the cutting of scrap metal of all kinds as progressively advanced thereto either in a more or less conglomerate mass, or as individual pieces.

The present application is a continuation-in-part of my prior application, filed on May 23, 1957 under Serial No. 661,197 entitled Double Cutting Metal Shear.

The principal objects of this invention are:

To provide a double cutting shear that, by reason of a novel relationship of blades therein, eliminates the usual requirement in metal shears of like character for use of hold down plates or clamps for the mass of metal pieces being cut;

To provide a double cutting shear that operates as it cuts to compact or flatten the sections or blocks of conglomerate materials as cut;

To prevent the objectionable bending or wrapping of metal pieces around the shear blades incident to cutting forces being applied thereto by coacting blades;

To provide a double cutting shear wherein the cutting forces, as applied to the two sets of coacting blades, balance each other in such manner that strain may be reduced and the guides for the reciprocally movable blade carrier frame may consequently be reduced in size, weight and other strength requirements and wear on these parts reduced accordingly;

To provide a shear wherein the blade bars are caused to be drawn to and held firmly against their seats as the shear opens by means of bolts of novel design and having a novel mode of application and which bolts, by reason of this operate to eliminate loosening of blade backing shims and incident tendency to shear the blade securing bolts.

To provide a machine wherein the operation of the reciprocally movable shear blades effects an automatic ejection and forced outflow of cut materials from the machine as it operates, thus to prevent the cut materials from piling up about the shear blades;

To provide a double cutting shear wherein the mass of conglomerate material to be cut is progressively advanced across a shear or base table wherein the fixed lower blades for making the double cuts are set at different levels thus to reduce the initial cutting strain on the blades and their mountings;

To provide a double cutting shear that does not require continuous and repeated sharpening or replacement of blades but which, by reasons of provision of means for balancing forces and other features of novel construction, permits satisfactory use of dulled blades, with clearance between them.

Further objects and advantages of the present invention reside in the various details of construction and combination of parts and in the particular arrangement of blades; in the provision for the replacement and reversibility and in improvements in the details of construction of the table across which the material is advanced for cutting.

It is also an object of this invention to provide a double cutting shear, embodying the above mentioned and other objects and advantages, whereby the amount of material that can be cut thereby into sections of a predetermined length, may be materially increased during a designated time interval, above that possible by use of a "single cut" machine.

In accomplishing these and other objects of the invention, I have provided the improved details of construction, the preferred forms of which are illustrated in the accompanying drawings, wherein:

FIG. 3 is a partial elevation of the machine of FIG. 1 as seen from its discharge side.

FIG. 4 is a horizontal section taken on line 4—4 in FIG. 3.

FIG. 5 is a fragmental elevation showing a part of the cutting or shear table and a part of the reciprocable blade carrier crosshead or frame and its guides.

FIG. 6 is a cross-sectional view, taken on line 6—6 in FIG. 5, showing one relationship of the two sets of coacting blades for the making of the "double cut."

FIG. 7 is a vertical section, taken on line 7—7 in FIG. 3.

FIGS. 8 and 9 are cross-sectional views of the paired anvils embodied in the cutting or shearing table and of coacting blades, as applied to the reciprocable blade frame and to the anvils for the double cutting of material passed across the table.

It will here be noted, for purpose of better understanding of the present shear, that it is not comparable either in operation, purpose or size to the ordinary punch press wherein blanks or shaped pieces are stamped from plates of uniform thickness by dies which have peripheral cutting edges and open bodies and which are generally designed to produce pieces of exact uniformity. The present shear is designed to operate principally on conglomerate massed scrap materials including heavy metal castings, rods of various sizes and diameters, metal plates of various forms and thicknesses, wires, etc., as advanced progressively and intermittently variable distances across a cutting or shear table in which shear blades are fixed, in a predetermined, spaced relationship at a right angle to the direction of advancement of the scrap materials, and with which said fixed blades, the complemental blades of a shear, as carried by a vertically reciprocable crosshead coact to produce with each downward action the double cut whereby the output of cut material is greatly increased. It is further to be understood that by reason of the character of work performed by the present shear and because of the shear being of a size far greater than that of ordinary types of single cut shears and presses, the power input for its operation is far beyond that ordinarily required in punch press operations. In the present instance the reciprocally movable cross-head, which mounts shear blades in parallel relationship along its opposite edges for coaction with blades mounted in the shear table, has a length of about seven feet and a width of about twelve inches and is solidly formed between the blades so as to crush and compact the conglomerate material as it cuts it into sections and to forcibly eject the sections from the shear. The shearing pressure employed is presently about 1200 tons, and during the shearing operation, this is applied in crushing and compacting the sections being cut free.

Figure 1:
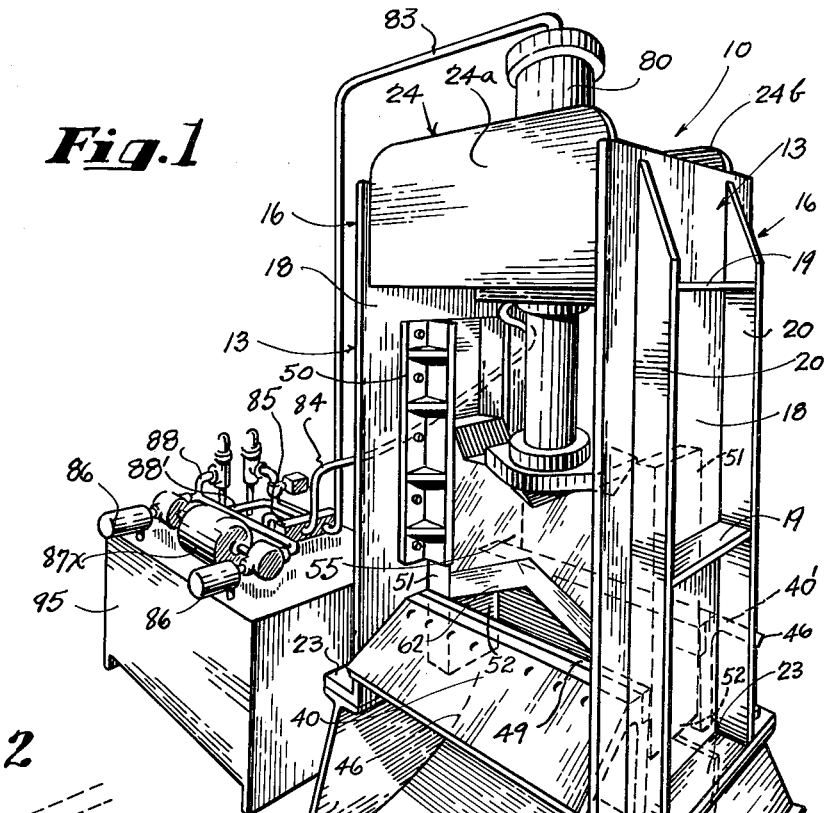
FIG. 1 is a perspective view of a double cutting shear embodying the improvements of the present invention therein.

Referring more in detail to the drawings:

The present double cutting metal shear, as shown in FIG. 1, is designated in its entirety by reference numeral 10 and it is to be understood, more particularly by its showing in FIGS. 3 and 7 that it is intended to be functionally mounted on a suitable foundation 11. In a presently preferred form of construction, the device includes a vertical upper frame structure or superstructure which is relatively light and, designated generally in FIG. 1 by reference numeral 13. This is supported upon a base frame structure comprising two short lengths of I-beams 15—15' that are horizontally disposed and rigidly joined in spaced, parallel relationship by parts presently to be described, and are suitably mounted on and anchored in the foundation 11.

The upper frame structure 13 of the shear comprises a pair of laterally spaced, opposite side members 16—16 each with a horizontal cross-section as shown in FIG. 4, wherein it is seen to include a web plate 18 of substantial width. The web members 18 of the two opposite side frames are vertically disposed, in parallel planes. Extending outwardly from each of the webs 18 along its outer edges are reinforcing ribs 20—20 and it is shown in FIGS. 1 and 3, that these ribs extend to the full length of the webs 18 and are joined between their ends by one or more cross-webs 19, thus to add rigidity to the frame 13.

In order that the opposite side frames 16—16 may be securely mounted on the base beams 15—15' the web 18 of each has a horizontal plate 23 fixed to its lower end edge and these plates, respectively, are disposed flatly upon and are bolted or otherwise securely fixed to the top edge flanges of the I-beams 15—15' as observed in FIG. 1.

The upper end portions of webs 18 are joined rigidly in their spaced parallel relationship by a horizontal, transversely extending cross-head designated, in general, by reference numeral 24. This cross-head, as shown in FIGS. 3 and 7, comprises the horizontal bottom plate 24x that is reinforced along its opposite side edges by plates 24a and 24b secured vertically on edge thereto. The ends of the cross-head members are rigidly secured between and to the upper end portions of the parallel webs 18—18 of the opposite side frames 16—16. Preferably, this cross-head 24 is formed as a casting but not necessarily so, and the manner of and means for its securement to the frames 16—16 may be varied in accordance with the desires or requirements.

The lower end portions of the webs 18—18 of frames 16—16 are connected together just above the level of the I-beams 15—15' by the complemental halves of a horizontal cutting base or table. These halves, hereinafter designated as "anvils" which are relatively heavy and substantially alike and preferably are as designated in the several views by reference numerals 40 and 40'. In their functional positions extending across the base, they are reversed relative to each other and are spaced a predetermined interval, thus to provide a downwardly opening discharge passage 41 between them. Each of these table forming anvils comprises a horizontal angle bar formed with a depending, substantially vertical flange or wall portion 45 integral with an outwardly and downwardly inclined flange or top portion 46, as well shown in FIGS. 7, 8 and 9 wherein it will be observed that the passage 41 between the flanges 45—45 of the paired halves is slightly wider across its lower end than across its top portion.

Formed in and extending lengthwise of each of the anvils 40 and 40' of this shear table, to its full length, is a recessed seat 48 which is inset into each vertical wall portion along the upper opposed edge thereof and in which a shear blade 49 is disposed and secured by means presently described. The four longitudinal corner edges of each blade 49 are formed by surfaces in right angle relationship and the blades may be reversely used in the seats to coact with similar blades of the reciprocally mounted blade frame presently to be described.

Preferably the positioning and relationship of the two anvils 40—40' of the cutting table is as shown in FIG. 7 wherein it is seen the anvil 40 located at the discharge side of the machine, is secured at a horizontal level slightly below that of the other anvil 40'. In another arrangement, for example, as shown in FIG. 6, the two anvils 40—40' are set at the same horizontal level. In either arrangement, whether as in FIG. 6 or as in FIG. 7, the material to be cut such as, for example, the bar-like piece B shown in these views, is progressively advanced through selective intervals, across the table. Then, when the cutting operation is performed by the coaction of the two sets of shearing blades, as presently will be explained, the free end portion of the bar B will drop across the inclined top portion 46 of the anvil 40 at the left side, and the section that is cut free between the two sets of blades, will fall free through the passage 41 and will engage a deflecting plate 42 that is fixed to and extends between the I-beams 15—15' and will be deflected toward the discharge side of the machine. The cut off blocks or sections of material that fall through passage 41, will be automatically advanced by the continuing operation of the reciprocating blades, and as they are thus advanced, they will carry with them the pieces or sections that drop across the downwardly sloping flange of the anvil 40.

Bolted, welded or otherwise suitably fixed vertically to the inside face of each of the webs 18 of the side frames 16—16 and in spaced parallel relationship, are substantial guide flanges 50—50, as shown in FIG. 4, and it is between these parallel guide flanges as located at opposite sides of the frame structure 13 that the opposite end portions of a blade mounting cross-head 55 are slidably contained for vertical reciprocal movement. Formed on opposite ends of the cross-head, as an integral part thereof, are aligning means 51—51 which are slidably contained between the respective pairs of guide flanges 50—50. It will be noted in FIGS. 1 and 8 that the aligning means include depending leg portions 52 which move within the space at the opposite ends of the anvils 40—40. During a shearing and compacting operation, a major portion of the lateral forces created is transmitted through the depending leg portions 52 to the anvils, and, therefore, the forces transmitted to the guide flanges, side frames and power mechanism are substantially reduced. This cross-head 55, well shown in FIGS. 7, 8, and 9 comprises a horizontal plate or bar 56 to the under surface of which strengthening webs 57—57 are fixed and which extend to the full length of the plate in spaced relationship as shown in FIGS. 6 through 9 and are joined by spacing webs 58.

Fitted between and secured to the webs 57—57 to extend from end to end of the cross-head frame 55 is a bar 60 which is so disposed that, together with the lower edge portions of the webs 57—57, it provides longitudinal seats 61—61 in which blade forming bars or cutting blades 62—62 are laterally inset and rigidly secured in said seat 61—61 and disposed for shearing coaction with the blade bars 49—49 as mounted by the two anvils of the cutting table.

Figure 10:
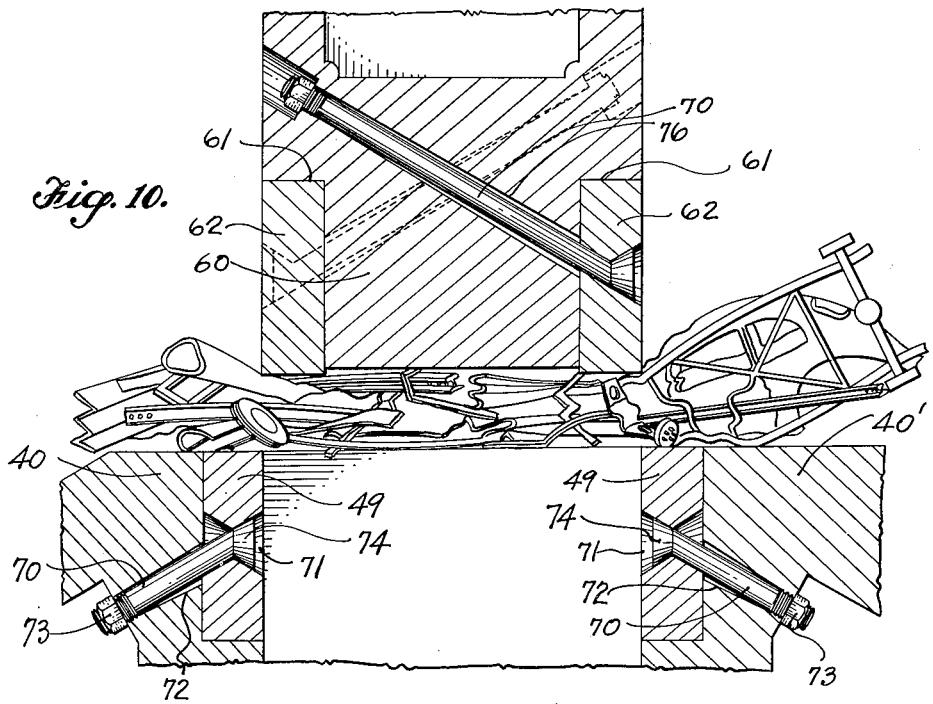
FIG. 10 is a sectional detail, illustrating the character and novel arrangement of the blade securing bolts of novel formation as herein employed.
Figure 11:
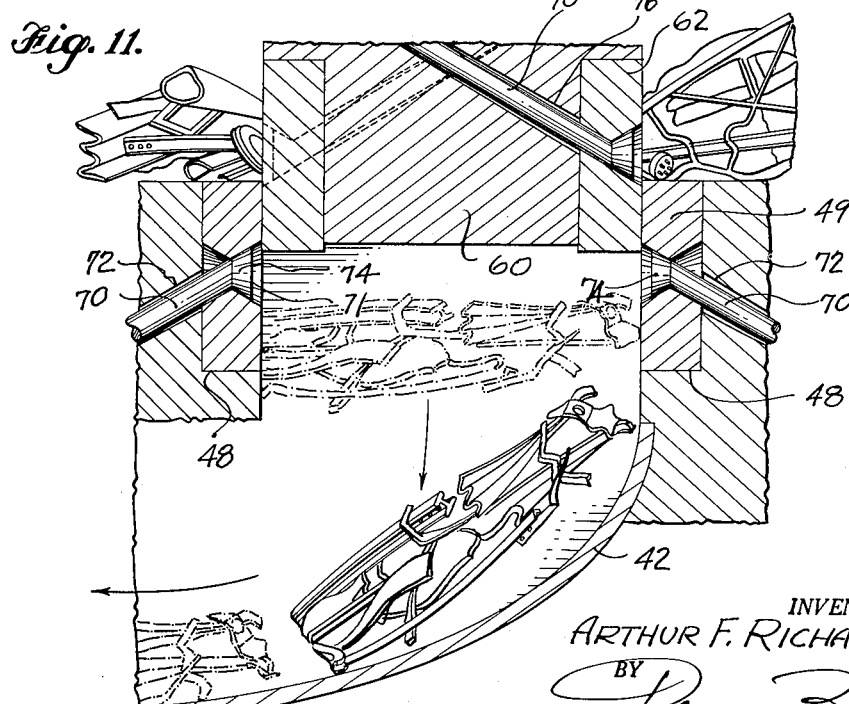
FIG. 11 is a similar sectional view showing the advancing of a cut out section to the discharge plate.

The blades 49—49 as mounted by the anvils 40—40' may be secured in their respective seats in various ways, for example, by bolts 64 applied through the anvil members and into the bars as shown in FIG. 7. Likewise, the blades of the cross-head may be secured in their seats by a plurality of screws 65 applied thereto as shown in FIG. 7. However, in the presently preferred construction shown in FIG. 10, the blades 49 as applied to the anvils and blades 62 as applied to the cross-head frame 60 are held seated by the use of bolts 70 applied angularly therethrough as has been shown in both FIGS. 10 and 11 and wherein it is seen that the blade bars are formed with bolt passing holes 71 formed therethrough by coaxial, conical bores directed thereinto from opposite side faces of the blades, and which holes 71 are adapted, when the blades are properly seated, to register with the inner ends of bolt passing holes 72 in the blade mountings. The holes 72, as provided for reception of those bolts 70 that hold the blades of the two anvils 40—40', are directed downwardly and outwardly from the vertical walls of the blade seats 48 through the anvils. The bolts 70 are shown in FIG. 10 to be equipped with securing nuts 73 at their outer ends whereby they can be drawn tight. The particular disposition of the bolts 70 here shown provides that the nuts 73 are easily accessible for removal to permit reversal or replacement of blades. At their inner ends, the bolts have conical heads 74 that will seat well within the conical inwardly tapered ends of the blades holes 71 and within the vertical plane of shearing edge surfaces of the coacting blades. The bolt holes 72 as formed through the blade mountings are tapered from their inner ends to their outer ends so that the bolts 70 as contained therein will have a substantial amount of clearance about their inner end portions to provide for blade sharpening adjustment but will be rather closely fit in the outer end portions of the holes. When the blades are properly seated and the securing bolts 70 properly applied thereto, for example, as in FIG. 10, the relationship of the bolts heads to their seats holds the bolts against rotation and permits tightening or loosening of the bolt securing nuts 73.

The bolt design and angular positioning also provides that the tendency of the blade bars to pull way from the backing metal forming the blade seats with the opening of the blades, is overcome and the shearing strain on the bolts is avoided. It will be understood, by reference to the showing of the blade securing bolts in FIG. 7, that with the opening of the shear the blade bars will have a tendency to drag and will pull away from their seats, thus to allow blade backing shims to slip and wear and a shearing force to be placed on the blade securing bolts by reason of their right angle relationship to blade slippage. However, in the disposition of the bolts in angular positions shown in FIG. 10, the shearing tendency is avoided by reason of the permitted lateral movement of the bolts, and the bolts are placed under tension which operates to draw the blades firmly and tightly against their vertical seating surfaces and thus eliminates the usual tendency to drag and bind during opening movements of the shear.

The manner of forming the bolt holes 71 through the blade bars permits the blades to be reversed and interchanged without interference with use of the bolts 70 as shown.

The advantages of the angular arrangement of bolts 70 relative to the direction of movement of the cross-head and the provision of tapered clearance for their mounting as provided by the tapered holes 76, resides mainly in the removal of shearing strain on the bolts, and the placing of the bolts under tension, as the shear opens, with the result that the blades are retained tightly against their seats.

The manner of and means for securing the blades of the cross-head is substantially like that of the lower blades except that in this instance the bolts 70 are extended through upwardly tapered holes 76 in the cross-head members as shown in FIG. 10.

The shearing off of sections or blocks of material progressively advanced through the shear is effected by the coaction of fixed blades mounted in the anvils 40—40' of the shear table, and blades mounted by the cross-head 55.

Assuming that the shear is constructed as illustrated and described, its normal mode of use will be as follows: Starting with the cross-head 55 lifted to open position to receive material between the upper and lower blades, the material to be cut, which is generally contained in a horizontal hopper leading to the receiving side of the shear, is advanced a predetermined distance across the shear table, so that the end portion thereof extends beyond the passage 41 a distance substantially equal to the width of the passage as shown in FIG. 10. Then the cross head 55 is actuated downwardly to effect the compacting and shearing off of the extended end portion and also that section which spans the top of opening 41. The latter portion as cut free is pressed downwardly through passage 41 and is discharged onto plate 42 to be deflected or advanced thereby toward the discharge side of the machine. The piece that is cut free from the end drops across the inclined flange 46 of anvil 40 and onto or into the path of material being discharged and is carried out therewith. It is apparent that in this double shearing operation, if the material being advanced is a conglomerate mass, as has been indicated in FIG. 10, it will be effectively compressed coincident with the shearing operation, thus to permit the blocks or sections of material to be more easily handled and to put them in a more desirable form for their intended use.

The reciprocal movements of the cross-head 55 as required for the coaction of the blades mounted therein with blades mounted by the anvils 40—40', is effected by a hydraulic cylinder 80 which is mounted vertically by the cross-head 24 fixed between the upper ends of the two frames 16—16, in the vertical axial line of the shear. This cylinder 80 is shown in FIG. 7 to be fitted with a piston 81 from which a piston rod 82 extends downwardly and is bolted or otherwise suitably connected at its lower end to the cross-head 55. Fluid pressure medium for up and down reciprocal actuation of the piston is selectively admitted to opposite ends of the cylinder 80 through pipe lines 83 and 84 and under control of a solenoid valve 85 applied in the hydraulic system as has been schematically shown in FIG. 2 wherein it is indicated that the employed fluid pressure medium is pumped from storage tanks, indicated at 86—86 by pumps 87 which are driven by connections with an electric motor 87x. These pumps deliver the pressure medium through pipe lines 88—88' to a pressure pipe line 89 that leads through the solenoid valve 85. When fully lowered, the blades 62—62 of the cross-head 55 fully overlap those of the anvils designated at 49—49.

Figure 2:
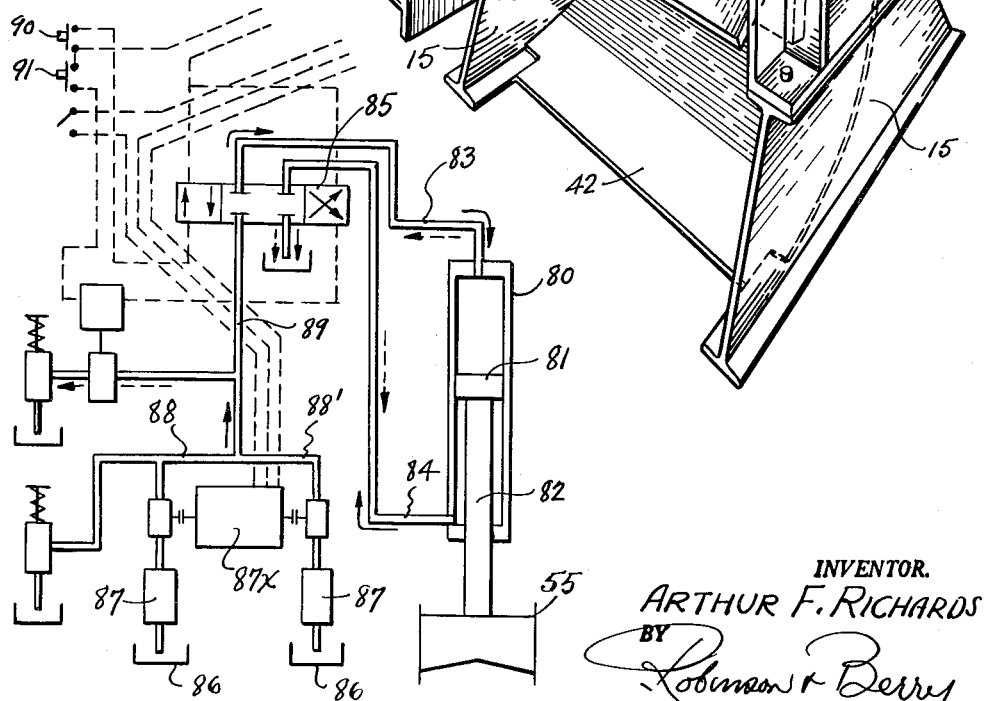
FIG. 2 is a schematic lay-out of the hydraulic system and electrical wiring for operational control of the machine.

Control of the solenoid valve is conventional and is through the operation of button switches designated in FIG. 2 at 90 and 91.

It is further to be understood that the hydraulic system includes required or desired relief valves and controls that are necessary for safety of operation.

Parts constituting or directly associated with the hydraulic system as diagrammatically indicated in FIG. 2, preferably are mounted on a table or support such as that designated by numeral 95 in FIG. 1.

The blades as horizontally mounted by the anvils are straight and continuous from end to end. The blades 62—62 as carried by the cross-head 55 may be arranged in the inverted V-formation, as shown in FIGS. 1 and 3 or may be inclined to the same extent from end to end, as indicated by the showing in FIG. 5. The manner of application of blades usually depends on the character of materials and work being done, and this is the case whether the anvils supported are at the same level as in FIG. 6 or at different levels, as seen in FIG. 7.

The use of the two sets of blades in lateral spacing for making the double shearing cuts is quite advantageous for several reasons; one of which resides in the fact that in the disposition of a conglomerate mass, as in FIG. 10, or a single bar of material as in FIG. 7, across the top of passage 41, the material is simultaneously acted on by the two sets of blades at points spaced therealong and is clamped and held in such way as to prevent the folding or bending of material about or between the shear coacting blades; another advantage resides in the fact that the side pressure exerted in opposite directions against the blades at opposite sides of the cross-head balance each other and relieves the cross-head guides of the unbalanced lateral pressure, strain and wear that results in the operation of single cut shears. Therefore, the vertical guides between which the ends of the cross-head are confined, may be reduced in size and weight without loss of any guiding efficiency.

The disposing of one of the fixed blades at a lower level than the other has an advantage in that the initial cutting strain is materially reduced.

In summarizing the various advantages residing in the present shear, that of the double shear operation that eliminates the requirement for hold down plates in connection with the shearing means and that which prevents binding of blades and bending of material between blades emphasizes the fact that the blades of this shear do not have to be kept in the usual shearing sharpness but may be satisfactorily employed when dulled to such condition that tearing separation of materials takes place. This is possible because of the great force applied to the cross-head and because of the coaction of the two sets of blades in making a double cut, each of which set operates to hold the material for cutting by the other set.

What I claim as new is:

1. A multiple cut shear for scrap metal for substantially simultaneously shearing scrap metal along two spaced apart lines of cleavage, said shear comprising a substantially relatively light-weight superstructure fabricated framework comprising spaced apart vertically disposed and opposed side frame members of a given thickness, and reinforcing means therefor, to provide a relatively light structural shaped frame, means rigidly joining said frame members at their upper ends across substantially the full width thereof, elongated spaced apart guide means rigid with each opposing inner surface of said side frame, a cross-head having opposite end portions slidable in said guide means, power means supported by said joining means and interconnected with the cross-head for reciprocating the cross-head relative to the guide means, the bottom portion of the cross-head having a solid median compression surface, cutting blades laterally inset and rigidly secured on each of the lower longitudinal edges of said cross-head, said cutting blades including cutting edge portions thereon, an anvil means, said anvil means comprising spaced apart complemental halves each having a substantially vertical wall portion and a top portion, said top portion being in rigid relationship with said wall portion and extending angularly and outwardly therefrom, said complemental halves extending between and rigidly joined at opposite ends thereof to the respective lower ends of said side frame members and forming a discharge opening therebetween, said discharge opening being of sufficient dimensions to receive said cross-head therein in shearing relationship, said portions comprising said anvil means being of a gauge and strength of material greater than said framework, anvil cutting blades rigidly secured and inset into each vertical wall portion along the upper opposed edge thereof, the cutting edges of said cross-head cutting blades being inclined upwardly from at least one end thereof with respect to the cutting edges of said anvil blades, means on at least one end of the cross-head entering between adjacent opposed portions of the complemental halves of the anvil before a shearing cut is made, the created lateral shearing forces being substantially sustained by the top portions of the complemental halves of the anvil means and said wall portions substantially sustaining vertical shearing forces during a shearing operation, and the position of said cross-head blades at the start of a shearing cut being so constructed and arranged and said anvil portions being so proportioned with respect to said framework in gauge and strength that substantially all shearing forces are sustained by said anvil means.

2. The shear as defined in and by claim 1, wherein the top portion of each complemental half of the anvil means extends outwardly and downwardly.

3. A shear as defined in and by claim 1, wherein the means on the cross-head which enters between the complemental halves of the anvil comprises downwardly depending leg portions on opposite ends of said cross-head.

4. A shear as defined in and by claim 1, including an inclined discharge chute positioned below and in alignment with said discharge opening to receive the sheared material therefrom.

5. A shear as defined in and by claim 1, wherein the cutting edge of one of the blades on said anvil is in a horizontal plane below the plane of the cutting edge of the blade on the other half of the anvil.

6. A shear as defined in and by claim 1, wherein the cutting edge of one blade on said cross-head is in a horizontal plane below the cutting edge of the other blade on said cross-head.

7. A shear as defined in and by claim 1, wherein the blades on said cross-head have cutting edges therealong of inverted V contour.

References Cited in the file of this patent

UNITED STATES PATENTS

| | | |
|---|---|---|
| 191,112 | Chase | May 22, 1877 |
| 535,207 | Jones | Mar. 5, 1895 |
| 847,526 | Taylor | Mar. 9, 1907 |
| 1,114,154 | Leach | Oct. 20, 1914 |
| 1,333,201 | Beatty | Mar. 9, 1920 |
| 1,519,983 | Robbins | Dec. 16, 1924 |
| 1,538,635 | Hahn | May 19, 1925 |
| 1,819,431 | McDonald | Aug. 18, 1931 |
| 1,964,457 | Diamond | June 26, 1934 |
| 2,009,660 | Irmis | July 30, 1935 |
| 2,725,101 | Van Hofe | Nov. 29, 1955 |
| 2,761,503 | Krueger | Sept. 4, 1956 |
| 2,927,492 | Porter | Mar. 8, 1960 |

FOREIGN PATENTS

| | | |
|---|---|---|
| 219,430 | Germany | Mar. 7, 1910 |